United States Patent [19]

Pennell

[11] 4,053,358

[45] Oct. 11, 1977

[54] MODULAR ASSEMBLY FOR SUPPORTING, STRAINING, AND DIRECTING FLOW TO A CORE IN A NUCLEAR REACTOR

[75] Inventor: William E. Pennell, Greensburg, Pa.

[73] Assignee: The United States of America as represented by the United States Energy Research and Development Administration, Washington, D.C.

[21] Appl. No.: 537,516

[22] Filed: Dec. 30, 1974

[51] Int. Cl.$^2$ .......................................... G21C 19/28
[52] U.S. Cl. ..................................... 176/50; 176/38; 176/61; 176/87
[58] Field of Search ...................... 176/43, 38, 61, 50, 176/87

[56] References Cited

U.S. PATENT DOCUMENTS

| 3,398,050 | 8/1968 | Yevick et al. | 176/87 |
|---|---|---|---|
| 3,619,367 | 11/1971 | Gumuchian | 176/61 |
| 3,736,226 | 5/1973 | Sakurama | 176/50 |
| 3,888,731 | 6/1975 | Finch et al. | 176/50 |
| 3,892,625 | 7/1975 | Patterson | 176/50 |

FOREIGN PATENT DOCUMENTS

| 1,440,702 | 4/1966 | France | 176/43 |
|---|---|---|---|

*Primary Examiner*—Samuel W. Engle
*Assistant Examiner*—S. A. Cangialosi
*Attorney, Agent, or Firm*—Edward L. Levine; Z. L. Dermer

[57] ABSTRACT

A reactor core support arrangement for supporting, straining, and providing fluid flow to the core and periphery of a nuclear reactor during normal operation. A plurality of removable inlet modular units are contained within permanent liners in the lower supporting plate of the reactor vessel lower internals. During normal operation (1) each inlet modular unit directs main coolant flow to a plurality of core assemblies, the latter being removably supported in receptacles in the upper portion of the modular unit and (2) each inlet modular unit may direct bypass flow to a low pressure annular region of the reactor vessel. Each inlet modular unit may include special fluid seals interposed between mating surfaces of the inlet modular units and the core assemblies and between the inlet modular units and the liners, to minimize leakage and achieve an hydraulic balance. Utilizing the hydraulic balance, the modular units are held in the liners and the assemblies are held in the modular unit receptacles by their own respective weight. Included as part of the permanent liners below the horizontal support plate are generally hexagonal axial debris barriers. The axial debris barriers collectively form a bottom boundary of a secondary high pressure plenum, the upper boundary of which is the bottom surface of the horizontal support plate. Peripheral liners include radial debris barriers which collectively form a barrier against debris entry radially. During normal operation primary coolant inlet openings in the liner, below the axial debris barriers, pass a large amount of coolant into the inlet modular units, and secondary coolant inlet openings in the portion of the liners within the secondary plenum pass a small amount of coolant into the inlet modular units. The secondary coolant inlet openings also provide alternative coolant inlet flow paths in the unlikely event of blockage of the primary inlet openings. The primary inlet openings have characteristics which limit the entry of debris and minimize the potential for debris entering the primary inlets blocking the secondary inlets from inside the modular unit.

9 Claims, 10 Drawing Figures

MODULAR ASSEMBLY FOR SUPPORTING, STRAINING, AND DIRECTING FLOW TO A CORE IN A NUCLEAR REACTOR

The invention disclosed herein was made in the course of, or under, a contract with the U.S. Energy Research and Development Administration, successor in interest to the U.S. Atomic Energy Commission.

CROSS REFERENCE TO RELATED APPLICATIONS

Reference is made to the following applications, assigned to Westinghouse Electric Corporation:

1. Application Ser. No. 503,148, filed Sept. 4, 1974 in the name of William E. Pennell (herein referred to as the Pennell application). The Pennell application may be referred to for a better understanding of how this invention cooperates with a complete nuclear reactor. Relevant material contained in the Pennell application is repeated herein. This invention represents an improvement in function and apparatus over the invention disclosed and claimed in the Pennell application.

2. Application filed concurrently herewith, Ser. No. 537,517, in the name of Jack E. Johnson (herein referred to as the Johnson application). The Johnson application may be referred to for an understanding of how the apparatus disclosed in the Pennell application and herein cooperate to function in the unlikely event of a core meltdown accident. Where applicable, reference numerals are consistent between this application and the Johnson application.

BACKGROUND OF THE INVENTION

1. Field of the Invention

This invention relates to nuclear reactors, and in particular to a reactor core support arrangement for supporting and providing fluid flow to the reactor core. The invention further comprises means for flow blockage prevention and alternative fluid flow paths in the unlikely event of debris entering the region below the reactor core which blocks the primary flow path.

2. Description of the Prior Art

Since the inception of the commercial nuclear power industry, a prime concern of all parties involved has been safety. Regulatory bodies, commerical manufacturers, and operating utilities have spent vast sums in research, design, and development of redundant systems and components to assure the safety of the public.

Regulatory bodies, primarily the United States Nuclear Regulatory Commission (NRC), define the design requirements of at least a large portion of a commercial nuclear reactor plant in terms of accidents or occurrences which have been experienced in the field and also in terms of hypothetical accidents or occurrences which may be experienced some day in the nuclear power industry. One such occurrence is the assumption that relatively large debris, up to the size and configuration of "asbestos coveralls", enters a reactor pressure vessel through inlet nozzles in a lower plenum. The reactor must insure continued safe operation with such debris potentially blocking primary fluid flow paths. This invention provides alternative flow paths assuming primary flow paths are blocked. The invention disclosed and described herein therefore provides that debris entering the lower plenum of the reactor will not cause blockage of fluid flow to a portion of the core, which could result in core meltdown.

Several apparatus have been disclosed which function to limit debris entering the core area. The inventions described and disclosed in the Johnson and Pennell applications may include a flow blockage and pevention disc at the lower extremity of each liner. These discs, however, do not form as continuous a barrier as the invention disclosed herein, and hence do not limit to the same degree the possibility of blockage of the primary inlet holes. They also do not provide alternative flow paths. Most important, as with all prior art flow blockage prevention apparatus, the discs are full flow "strainers", as opposed to the partial flow straining of this invention. They also increase any potential liner vibration. Although the apparatus disclosed in the two referenced applications include a plurality of inlet openings in each inlet modular unit which should greatly limit the possibility of total blockage of inlet flow to any one inlet modular unit, regulatory requirements may dictate the assumption that total blockage of the primary flow path into at least one modular unit occurs.

Other apparatus disclosed have generally comprised a separate perforated plate or bell in the lower plenum of a reactor. These may be attached to the lower core support structure, or the vessel wall. These apparatus typically comprise a plurality of small holes through which reactor coolant flows, and are suspended far enough below a lower horizontal plate to allow mixing of coolant and radial pressure equalizaton before the fluid enters the primary flow paths through the lower plate in the event of blockage of some of the small holes. Either of the plate or bell concepts have the drawback of a large full flow filtering structure which significantly increases the pressure drop through the reactor vessel and hence increases necessary pump capacity and lowers reactor efficiency. This invention, however, does not significantly increase the pressure drop since the primary inlet flow holes remain below the axial blockage barrier, and therefore only a portion of the coolant flow is actually "strained" by the barriers. The primary inlet flow holes are located so as to minimize the potential for entry of debris and the possibility of any debris entering the primary inlets blocking the secondary inlets from inside the modular unit.

The full flow type strainers or flow blockage prevention devices of prior art apparatus are also expensive to manufacture. They also require additional time in reactor construction. High fabrication costs are a direct result of the large diameters of such apparatus, as well as the means of attachment of such large components to the reactor lower internals or reactor vessel. The invention disclosed and described herein, comprising a plurality of relatively small hexagonal barrier plates integral with the liners, results in significant cost and fabrication time savings compared to a single large diameter plate or bell.

The singular large strainer plate device of prior art apparatus, if utilized on a reactor of the type of the illustrative embodiment, could also present maintenance concerns. If significant leakage occurs between the liners and the lower horizontal plate during initial plant hydrotest, the underside of the plate could prove relatively inaccessible without total removal of the plate. Such removal would be expensive and time consuming. Removal of a liner and integral axial barrier would be comparatively simple, quick, and less expensive.

Functionally, prior art apparatus of the type discussed do not necessarily limit radial entry of debris above the large plate or bell. If additional radial preventative means are incorporated, such means normally contribute a large pressure drop. The invention disclosed and discussed herein, however, provides peripheral radial barriers without significant pressure losses, as the primary path of coolant inlet flow is not effected to any large degree by such barriers. Also, one of the most significant functional advantages of the invention disclosed herein is the provision of alternate flow paths under assumed total blockage of the coolant primary inlets into one or more modular units, and hence into a plurality of core assemblies. Under such conditions, there will be no unacceptable reduction of normal coolant flow to any core assembly.

The invention herein disclosed, when compared to prior art flow blockage apparatus, is less expensive to fabricate and install, is less time consuming, is functionally superior, minimizes pressure drop, and better anticipates potential initial startup problems.

SUMMARY OF THE INVENTION

In accordance with this invention the core component assemblies of a nuclear reactor, which in the illustrative embodiment include fissile fuel assemblies and control rod assemblies in the inner core region, and shielding assemblies and fertile fuel containing assemblies in the peripheral core region, are separately supported in inlet modular units. Each inlet modular unit is removably mounted, held by gravity together with hydraulic forces, in liners in the horizontal plate of the lower core-support structure. Fluid seals are interposed above the upper and below the lower aligned coolant fluid inlet openings in the modular units and liners. Each inlet modular unit may additionally include a container which collects and provides cooling means for core debris subsequent to accidental core meltdown. Each inlet modular unit directs flow of the reactor coolant fluid to a plurality of reactor component assemblies which are removably mounted, held by gravity together with hydraulic forces, in receptacles of the corresponding inlet modular unit. Fluid seals are also interposed above and below the aligned coolant inlets to the core assembly ducts in the inlet modular unit receptacles. Below the liner/modular unit seals, each modular unit is subjected to low pressure which essentially balances the low pressure in the region where the fluid emerges from the core components. The low pressure in the volume below the inlet modular unit lower seal is maintained by venting this volume to the low pressure annular region of the reactor. The seal, flow path, and vent design creates the necessary hydraulic balance. Gravity together with this hydraulic balance is adequate to hold the inlet modular units in the liners. A similar vent system allows gravity together with hydraulic balance to hold the core assemblies in the inlet modular unit receptacles. The inlet modular units direct coolant fluid to interconnecting flow paths to provide controlled bypass flow to peripheral component assemblies, and each inlet modular unit may include orificing to achieve proper flow distribution. Each inlet modular unit has a bypass pipe through which fluid which leaks below each modular unit passed the seal can be removed. Also, by controlling the amount of additional coolant flow into the bypass pipe, the amount of coolant flow to the reactor vessel and peripheral core components can be controlled. The modular units may be designed for the life of the reactor but are readily removable for maintenance or replacement. The coolant fluid is injected into the vessel below the liners and the coolant fluid is uniformly distributed to all inlet modular units. The inlet modular units have the same outside dimensions so that they can be accommodated by like liners. Discriminator features assure that inlet modular units are positioned only in their assigned locations. Internally the modules differ in accordance with their functions and flow requirements. Typically there may be a plurality of different internal structures among the modular units.

In accordance with this invention, permanently affixed to each liner, below the horizontal support plate, is a generally hexagonal axial debris barrier. The plurality of debris barriers form a semi-continuous plate, so as to form the lower surface of a secondary high pressure plenum, the upper boundary of which is the bottom surface of the horizontal support plate. A large percent of coolant fluid flow enters the liners/modules/containers through inlet openings in the primary plenum below the axial debris barriers, and a small percent enters through similar inlet openings in the secondary plenum. In the unlikely event of flow blockage of the primary inlet openings, adequate coolant flow will enter solely through the secondary inlet openings. Axial debris barriers on peripheral liners also contain radial debris barriers which form a semi-continuous radial barrier to debris entry into the secondary plenum. The invention disclosed and described herein therefore alleviates the possibility of accidental flow blockage causing coolant starvation to a portion of the core, yet minimally affects reactor operating performance.

DESCRIPTION OF THE PREFERRED EMBODIMENTS

Figure 1:
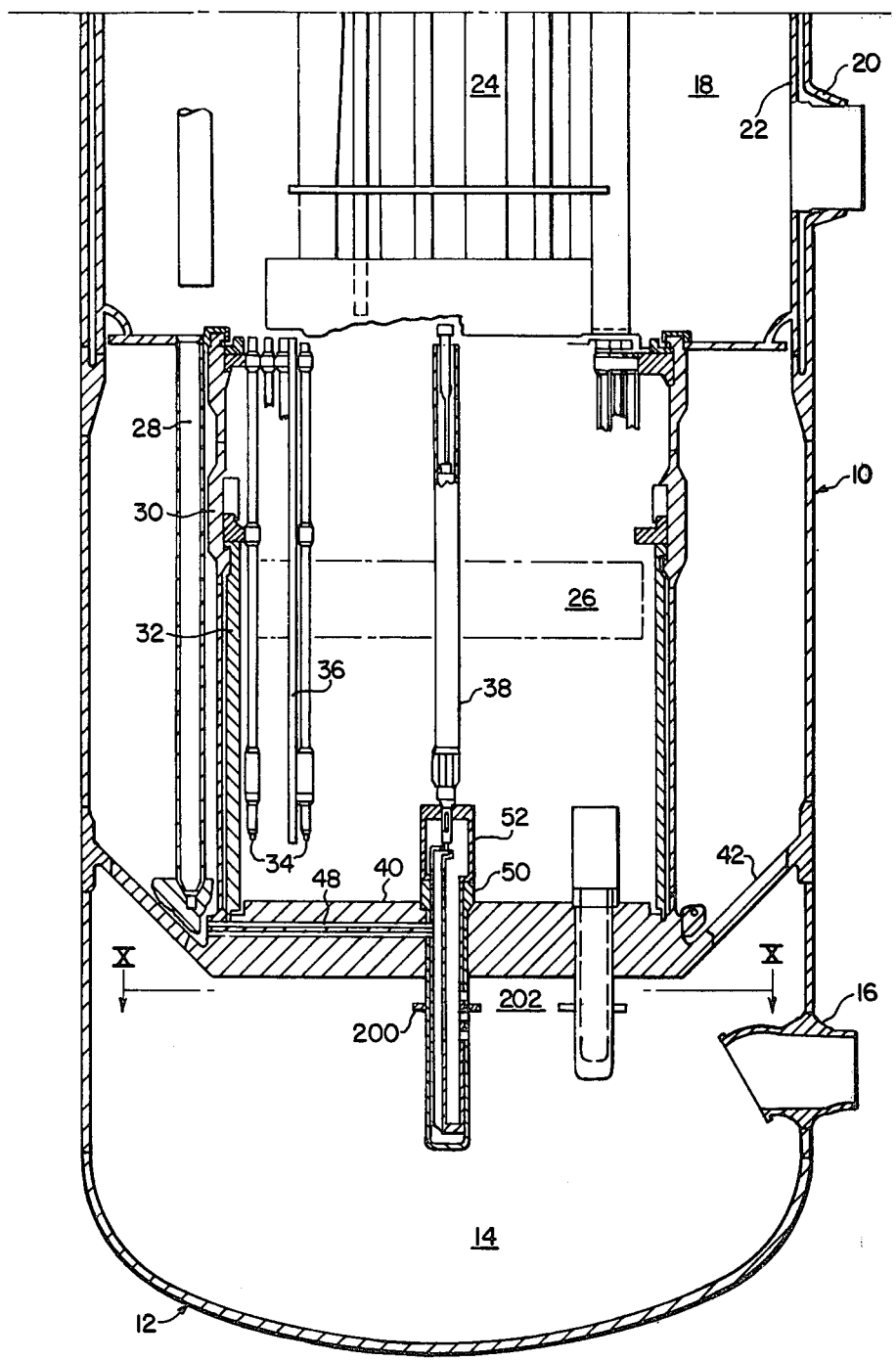
FIG. 1 is an elevation, in cross section, of a nuclear reactor in accordance with this invention.

FIG. 1 shows a reactor bounded by a generally cylindrical pressure vessel 10 closed at the bottom by a bell 12 which bounds a primary inlet plenum 14. Reactor coolant, such as liquid sodium, enters the vessel under pressure through a plurality of inlet nozzles 16, and exits the vessel 10 as hot liquid from an outlet plenum 18 through a plurality of outlet nozzles 20. The vessel is provided with a permanently attached thermal liner 22 which shields the vessel from thermal shock and which encircles the outlet plenum 18 and the regions above and below the outlet plenum 18. The reactor is bounded at the upper extremity by a head (not shown) bolted to a flange (not shown) of the vessel 10. Other components shown within the vessel include the upper internals 24, supported from the vessel head (not shown), which function to provide a backup mechanical hold-down for the core 26, to position, protect, guide and support core instrumentation, to assure alignment of the control rod system, and to control flow in the vessel outlet plenum 18. Components of the core 26 and lower internals shown include, radially from left exterior to interior, a fuel storage area 28, a core barrel 30, a fixed shield 32, a series of removable shield assemblies 34 bounding a surveillance specimen location 36, and, shown centrally located, a control rod drive mechanism assembly 38. The core 26 components and assembly types are described in more detail in the Pennell application.

Figure 2:
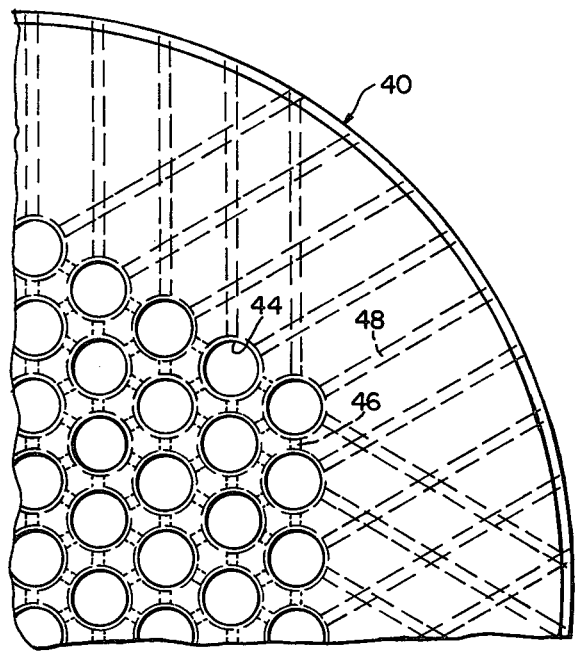
FIG. 2 is a partial top view of the thick lower horizontal plate of FIG. 1.
Figure 4:
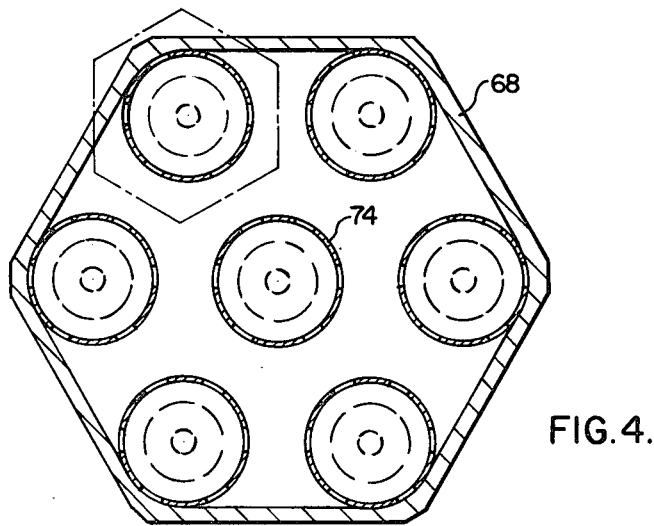
FIG. 4 is a plan section taken through the upper portion of the inlet modular unit section IV—IV of FIG. 3.

The core barrel 30 is permanently welded to a thick, generally circular, horizontal support plate 40 which is permanently affixed to the vessel 10 by means of an inverted truncated conical plate 42. Throughout the horizontal support plate 40 are a plurality of support holes 44, shown in FIG. 2. The support holes 44 have plate bypass openings 46 which, in conjunction with other components hereafter described, form bypass channels 48 to the periphery of the horizontal support plate 40. A plurality of liners 50 of generally hollow cylindrical form include means to permanently affix the liners 50 to the horizontal support plate 40. Removably mounted in each liner 50 is an inlet modular unit 52.

Each liner 50 comprises an integral axial, generally hexagonal debris barrier 200 about its periphery (FIGS. 7 through 10). The axial debris barrier 200 is located below the horizontal plate 40, and a small clearance may be allowed between axial debris barriers 200 of adjacent liners 50, so as to form a semi-continuous barrier assembly 201 (FIG. 10) parallel to, and beneath the horizontal support plate 40. The axial debris barrier 200 may be formed integrally with the liner 50, or fabricated and attached separately by means such as welding. A secondary inlet plenum 202 (FIG. 7) is formed between the barrier assembly 201 and the bottom of the horizontal support plate 40. There are several paths of flow communication, described below, between the primary inlet plenum 14 and the secondary inlet plenum 202, such that the pressure in the two plenums 14, and 202 is essentially equal.

As shown best in FIGS. 3 through 7, which represent a combination of embodiments of the invention, each liner 50 has a plurality of liner primary coolant inlet openings 54 below the barrier assembly 201 for admitting fluid from the primary inlet plenum 14 under pressure and a plurality of liner secondary inlet openings 203 immediately below the horizontal support plate 40, for admitting fluid under pressure from the secondary inlet plenum 202. Each liner also has liner bypass holes 56 which communicate with the plate bypass openings 46 of the horizontal support plate 40 for transmitting bypass fluid, discussed hereafter. The lower portion of a liner 50 may include a boss 58 and alignment post 60 arrangment, secured by a dowel pin (not shown). Each liner 50 receives a removably mounted inlet modular unit 52; the liner post 60 may differ for different inlet modular units 52, and in addition to aligning the unit 52 within the liner 50, may also assure that each liner receives the proper inlet modular unit 52. Alternative means of location and discrimination can be utilized. Each inlet modular unit may also include a container 112, which will contain molten core debris in the unlikely event of core meltdown, and act as a means for heat transfer from the molten debris to the coolant fluid in the primary inlet plenum 14. A detailed description of the container 112 is provided in the Johnson application. The axial debris barriers 200 are located above the portion of the container which will contain molten debris in the event of accident, so as not to lessen the heat transfer capability.

Figure 3:
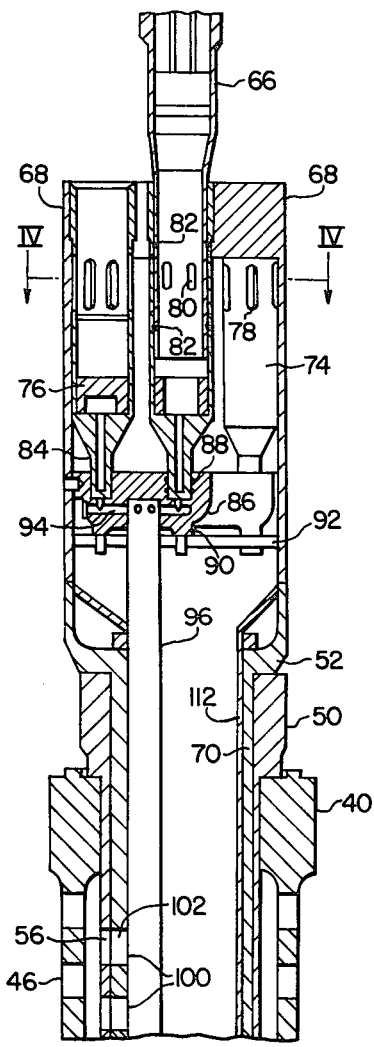
FIG. 3 is a partial elevation, in cross section, showing details of combined types of removable inlet modular unit receptacles contained in a liner.
Figure 5:
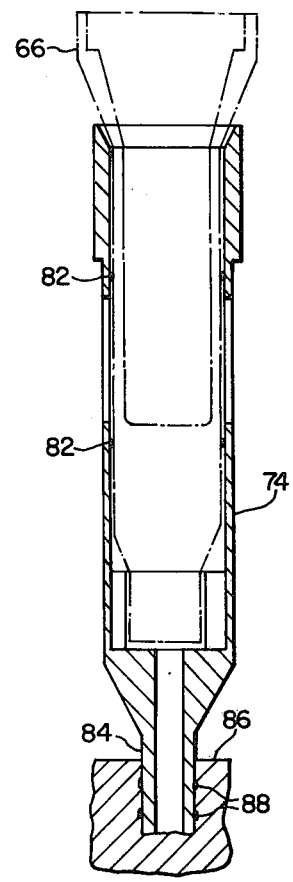
FIG. 5 is a simplified elevation, in cross section, of a typical inner inlet modular unit receptacle.
Figure 6:
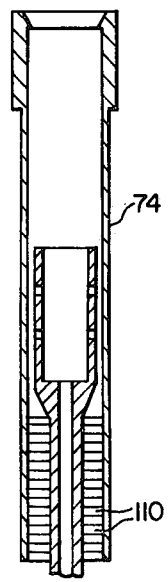
FIG. 6 is a simplified elevation, in cross section, of a typical outer inlet modular unit receptacle.

In a liquid metal cooled fast breeder nuclear reactor of the type of the illustrative embodiment there are two basic types of inlet modular units 52, one of which may receive fissile fuel assemblies 66, or control rod assemblies 38, which both require high flow coolant fluid, and the second of which receives assemblies at the outer regions of the core 26 which require a smaller coolant fluid flow. A few inlet modular units 52 combine these functions, and may receive both inner and outer region assemblies. Internally the modular units 52 differ in accordance with function and flow requirements, and typically there are a plurality of different internal structures. Each inlet modular unit 52 is an elongated member having a partially hollow hexagonal head 68 and a hollow cylindrical stem 70. The stem 70 is tapered at the bottom for insertion guidance and has an alignment hole 72 for receiving the alignment post 60 of the liner 50. The top of the head 68 has a plurality of openings (FIG. 4) into which receptacles 74 of different types are seated and secured. Each receptacle 74 is of generally hollow cylindrical form internally dimensioned to receive the inlet duct of the lower portion of a fuel assembly 66, or the duct of a control-rod assembly 38, or the duct of an outer region assembly (not shown). Typical receptacles are shown in FIG. 3, and additional detail is shown in FIGS. 5 and 6. There are different receptacles 74 which differ in that some include a block 76 representative of the several different discriminator parts which are secured by pins (not shown) in the receptacle 74 to discriminate between the different types of assemblies which each receives. Each receptacle 74 has receptacle slots 78 which are aligned with similar assembly slots 80 in the ducts of the assembly inserted in the receptacle 74. Each assembly has piston rings 82, or other seals, above and below the receptacle slots 78. These seals 82 minimize downward leakage of the fluid under pressure which enters the receptacle slots 78, and therefore minimizes any potential buildup of pressure in the low-pressure region directly below the assembly duct. In lieu of the seals 82, a close fit between the assembly duct and the receptacle may be used as an alternative means of limiting leakage. The fluid which penetrates to the low pressure regions of the receptacle 74 is in any event vented. Each type of core assembly has a greater specific gravity than the coolant fluid, and each assembly remains in the receptacle 74 due to an hydraulic balance and its own weight. The term hydraulic balance, when used in this application, refers to the fact that the geometry of mating components and the flow of reactor coolant fluid about and through these mating components are such that the hydraulic pressure forces are essentially balanced and the proper components are restrained in place by their own weight. Put in other terms, hydraulic balance refers to essentially equalizing forces that allow a component's weight to be sufficient to hold that component in place.

Each receptacle 74 tapers into a hollow stud 84 at the lower end and is secured by engagement of its stud 84 in spider arms 86. The spider 86 is secured to the modular unit head 68. Peripheral seals 88 are provided between each stud 84 and the portion of the spider 86 which it engages to prevent leakage of the pressurized fluid around the stud 84.

Bosses 90 extend from the lower faces of the spider arms 86. The bosses 90 engage a strainer flow-distribution plate 92 which distributes the coolant fluid and prevents the flow of solid debris, which is small enough to enter the inlet modular unit 52 through the coolant inlet openings discussed below. Means are provided to secure the plate 92 to the bosses 90.

Each spider 86 has a spider cavity 94. The hollow interior of each stud 84 communicates with the interior of the corresponding receptacle 74 and with the cavity 94 permitting any leakage through the peripheral seal 88 and seals 82 to flow into the corresponding cavity 94. Means are provided to seal the cavity 94 in each spider arm 86 near the head 68 of the modular unit 52.

The cavities 94 of each spider arm 86 communicate with a bypass pipe 96 which extends from the spider arm 86 throughout the length of the modular unit 52 and opens into a space 98 between the lower tip of the modular unit 52 and the liner 50. The bypass pipe 96 also has pipe lateral openings 100 which communicate with the bypass channels 48 (FIG. 1) through the liner bypass holes 56 in the wall of the liner 50, through stem bypass holes 102 in the wall of the modular unit 52, and through container bypass openings (not shown) in the wall of the container 112, if a full length container is utilized. The bypass channels 48 transmit fluid to the lower-pressure regions within the vessel 10.

Figure 7:
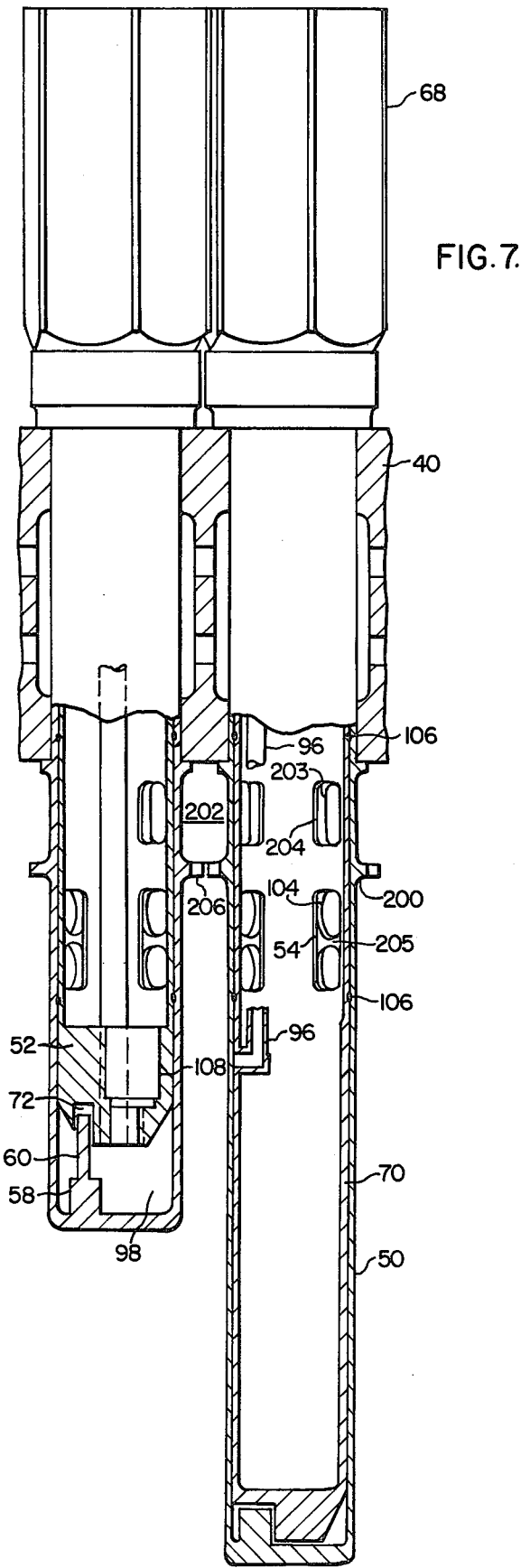
FIG. 7 is an elevation, in cross section, through an inner and outer inlet modular unit, showing additional detail of a secondary plenum formed by axial debris barriers.
Figure 8:
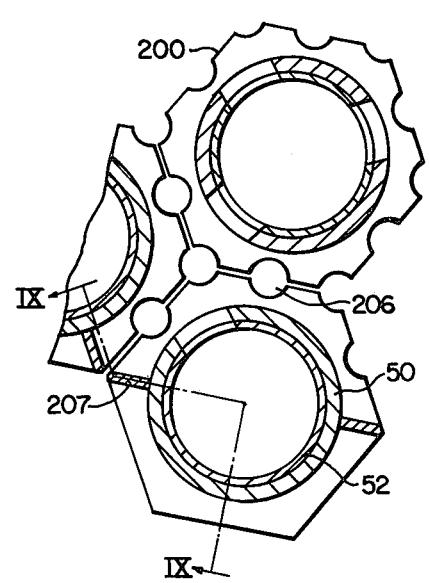
FIG. 8 is a partial blowup view of FIG. 10.
Figure 9:
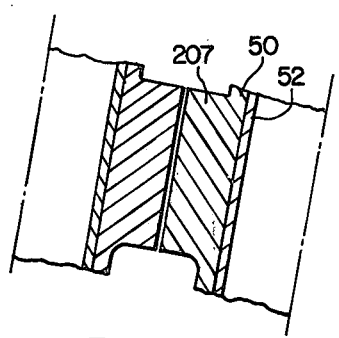
FIG. 9 is a view, in cross section, taken at IX—IX of FIG. 8.
Figure 10:
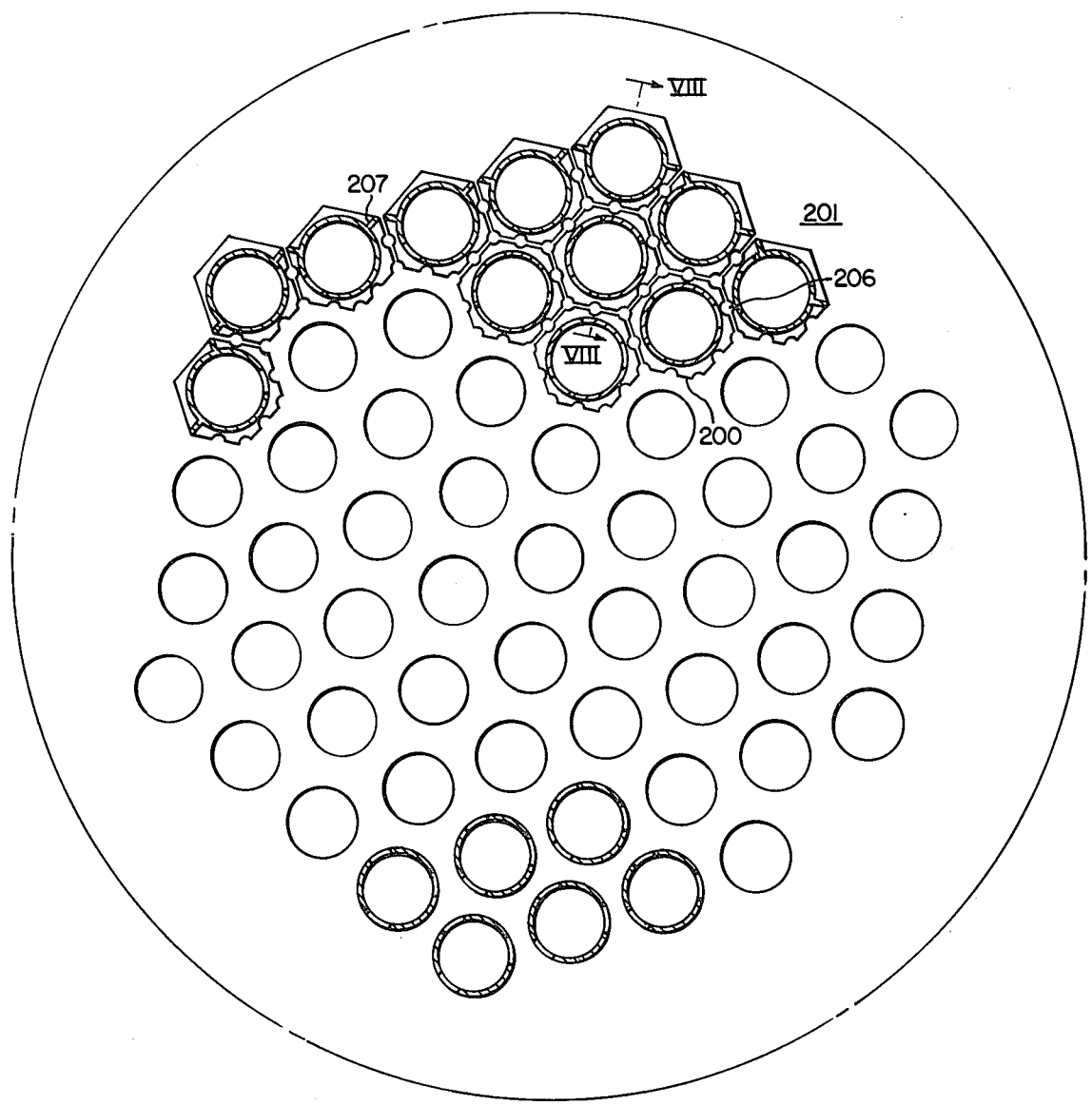
FIG. 10 is a simplified plan view, in cross section, taken at X—X of FIG. 1.

The stem 70 of the modular unit 52 has a plurality of modular unit primary coolant inlet openings 104 which are aligned with the liner primary coolant inlet openings 54 in the wall of the liner 50. The stem 70 also comprises modular unit secondary coolant inlet openings 204 aligned with the liner secondary inlet openings 203 in the wall of the liner 50. Above the secondary inlets and below the primary inlets, inlet seals 106, typically piston-ring seals, are provided. During normal operation, the high pressure coolant fluid enters the modular unit 52 through the aligned primary and secondary inlet openings. The plurality of aligned inlets may be of various shapes such as circular, elliptical, or rectangular. They may be the same shape in both the modular unit 52 and liner 50, or of differing shape as shown in FIG. 7, as long as the shape and orientation is such as to (1) limit debris entry, (2) limit the potential of debris entering the primary inlets blocking the secondary inlets from inside the modular unit, and (3) maintain sufficient flow. The embodiment depicted in FIG. 7 performs these functions through utilization of generally rectangular liner primary coolant inlet openings 54 aligned with a plurality of generally elliptical inlet modular unit primary coolant inlet openings 104. Shown for each liner primary inlet opening 54 are two aligned modular unit primary inlet openings 104. Between each pair of modular unit inlet openings is formed a bar 205, which acts to limit entry of debris of the "asbestos coverall" type. The orientation of the aligned primary inlets 54 and 104 is such that if the modular unit 52 were to tend to rise in the liner 50, thereby raising the core assemblies in the inlet modular unit receptacles 74, the upper internals 24 at the top of the core assemblies limit the rise such that sufficient coolant flow will continue to enter the modular unit through the portion of the primary inlets which remain aligned.

During normal operation, a relatively large percent of the coolant enters through the primary openings, and a relatively small percent enters through the secondary openings. Initial considerations in the illustrative embodiment show the "relatively small" percent of flow to be on the order of five to ten percent of total modular unit inlet flow. Actually, for core cooling purposes, no secondary inlet flow is required. The actual percent of total flow from the secondary inlets can be optimized, however, to maximize performane, and is not directly related to safety considerations. Maximum operating performance is used here to mean minimizing the pressure drop through the reactor, thereby increasing reactor efficiency and lowering pump capacity. Further, at least some inlet flow through the secondary inlets insures that a stagnant area in the secondary inlet plenum 202 will not form. Avoidance of any stagnant coolant fluid in a reactor core has long been an objective of reactor designers, and minimizes any potential for gas bubble buildup. The debris barriers 200 shown in FIG. 8, contain barrier flow holes 206, sized to limit the entry of any debris which could cause coolant starvation to the core, which barrier flow holes 206 may be utilized to maximize reactor performance. Whether the barrier flow holes 206 are utilized or not, the adjacent surfaces of adjacent axial debris barriers 200 may allow a small clearance, typically up to one-quarter of an inch, to provide coolant flow into the secondary plenum. In the unlikely event of significant, including total, flow blockage of the primary inlet openings 54 and 104, flow will enter the blocked inlet modular unit through the secondary inlet openings 203 and 204 in the secondary high pressure inlet plenum 202. Radial debris barriers 207 may be included on at least two sides of each peripheral hexagonal axial debris barrier 200, so as to form a semi-continuous barrier to debris entry radially above the barrier assembly 201. Coolant fluid may enter the secondary plenum 202 by several flow paths: axial entry through the clearance between adjacent debris barriers 200, axial entry through the barrier flow holes 206, if incorporated, radial entry through clearance between adjacent radial debris barriers (FIG. 10), and as next described. If significant primary inlet opening blockage occurs, coolant fluid may also enter the secondary inlet plenum 202 by exiting the secondary inlets of the non-blocked modules. Such fluid would enter a non-blocked liner/inlet modular unit through the respective aligned primary inlet openings 54, 104, and pass upward. A portion of this coolant fluid would then continue upward through the normal flow paths discussed hereafter, and a portion would exit the aligned secondary inlet openings 204, 203 in the inlet modular unit/liner respectively, entering the secondary plenum 202. The combined flow area of the plurality of primary inlet openings in a modular unit can be equal to or greater than the flow area of the stem 70 or container 112 cross section; the combined flow area of the plurality of secondary inlet openings in a modular unit can also be equal to or greater than the stem 70 or container 112 flow area.

During normal operation, the coolant which enters the modular unit stem 70 from the primary and secondary inlet flows upward through the strainer flow distribution plate 92, through the assembly slots 80 and up inside the core assemblies. The fluid is discharged at a low pressure into the outlet plenum 18. The inlet seals 106 suppress the flow of fluid below the modular unit 52 so that an hydraulic balance is established. The inlet modular unit 52 has a higher specific gravity than the fluid and is firmly held by gravity together with the hydraulic balance in the liner 50. The inlet seals 106 also suppress fluid flow in the annulus between the liner 50 and the modular unit 52 above this seal. Downward leakage through the inlet seal 106 flows into the bypass pipe 96 through space 98 and out through openings 100, 102, and 56 (FIG. 3) to the low-pressure regions of the vessel 10.

Differing inlet modular units 52 serve for receiving fuel assemblies 66 or control rod assemblies 38, or other assemblies at the outer regions of the core 26 which require a smaller coolant fluid flow than the inner assemblies 66 or 38. To provide a controlled flow of fluid to the peripheral components during normal operation, the outer inlet modular units 52 may include stacks 108 of orifice plates at the base of the stem 70. Similar orifice plates 110 (FIG. 6) may be included within the receptacles 74, and also immediately above the strainer flow distribution plate 92 (not shown). These stacks impede the flow of fluid producing a substantial pressure drop in the fluid. The fluid to the peripheral assemblies enters the inlet modular unit 52, and may follow two paths: a direct upward path to the receptacles 74, and a downward bypass path. The fluid in the path to the receptacles 74 flows in a direct path through the upper orifice plates 110 and into the peripheral assemblies. The fluid in the bypass path flows down through the lower orifice plates 108 and up into the bypass pipe 96, and thence out through the bypass holes. The fluid through the upper orifice plates 110 passes from the orifice plates 110 up between the receptacle wall 74 and a receptacle inner shell with vertical holes (not shown) in it. The fluid passing through these holes then radially enters the duct of the assembly plugged into the receptacle 74. The receptacle may also allow for a small portion of this fluid to pass down the hollow stud 84 into the bypass pipe 96. The peripheral inlet modular units 52 are in most respects similar to the inner inlet modular units 52. Different assemblies in the peripheral modular units 52 require different coolant flow. These requirements are met by providing different numbers of the above discussed orifice plates, or by omitting some of the orifice plates altogether.

The container 112 may be incorporated in any inlet modular unit 52 to contain and cool molten core debris in the unlikely event of accidental core meltdown. The flow path of molten debris would essentially be the reverse of the coolant flow path during normal operation: down through the upper portion of the receptacles 74, out the receptacle slots 78, over the spider arms 86, through the strainer flow-distribution plate 92 (which may melt or lose structural integrity at the high temperature of the molten debris), into the container 112, and remain contained in the portion of the container below the lowest inlet opening.

This invention therefore not only provides a partially removable core support structure consistent with nuclear maintenance requirements, but also alleviates the possibility of accidental flow blockage causing coolant starvation to the core through utilization of debris barriers and alternate inlet flow paths. Further, if accidential core meltdown were to occur, the invention minimizes detrimental effects. Since the debris barriers add no significant pressure drop to the reactor, the invention provides increased safe operation capability with minimal effect on plant performance.

I claim as my invention:

1. In a nuclear reactor of the type wherein a liquid reactor coolant, is circulated through a reactor vessel housing a core having a plurality of assemblies and said assemblies are removably supported in a plurality of inlet modules removably supported in liners mounted to a bottom plate, said liners extending below said plate into a high pressure region and the area above said plate being a lower pressure region, the improvement comprising:

horizontal debris barriers integrally mounted about the radial periphery of each said liner below said plate, said barriers spaced closely adjacent one another to collectively form a substantially continuous horizontal boundary dividing said high pressure region into a primary high pressure zone below said boundary and a secondary high pressure zone between said boundary and said plate, and further comprising aligned primary coolant inlet openings in each said liner and module in said primary zone and aligned secondary coolant inlet openings in each said liner and module in said secondary zone.

2. Apparatus of claim 1 wherein each said debris barrier is hexagonal.

3. Apparatus of claim 1 wherein each said debris barrier comprises flow holes.

4. Apparatus of claim 1 wherein peripheral liners additionally comprise means for blocking radial entry of debris into said secondary zone.

5. Apparatus of claim 1 wherein the orientation of said primary inlet openings comprises barrier means to debris entry.

6. In a nuclear reactor utilizing liquid coolant, a modular assembly for supporting assemblies of a core, said modular assembly including a generally horizontal supporting structure and a plurality of inlet modular units removably mounted in liners, said liners being permanently affixed to said supporting structure, each of said inlet modular units having receptacle means for receiving assemblies of said core, said liners each comprising peripheral debris barriers fixedly mounted about said liner, said debris barriers each being closely spaced from adjacent debris barriers so that said debris barriers together form the lower surface of a secondary plenum below said supporting structure, said inlet modular unit and liner each comprising a plurality of aligned primary inlet flow holes below said secondary plenum and a plurality of aligned secondary inlet flow holes within said secondary plenum, whereby a large portion of coolant flow enters each said modular unit through said primary inlet flow holes and a small portion of coolant flow enters each said modular unit through said secondary inlet flow holes, and upon blockage of said plurality of primary inlet flow holes of at least one liner and modular unit a large portion of coolant flow enters said modular unit and liner through said secondary inlet flow holes.

7. Apparatus of claim 5 wherein a plurality of said modular units comprises means for containing molten core debris subsequent to accidental core meltdown.

8. Apparatus of claim 4 wherein said means for blocking radial entry of debris comprises vertical radial debris barriers affixed to said horizontal debris barriers and extending into said secondary zone, said vertical barriers spaced closely adjacent one another to collectively form a substantially continuous radial boundary about said secondary zone.

9. Apparatus of claim 5 wherein said orientation of said aligned primary coolant inlet openings comprises a plurality of said openings in said liner aligned wih each said opening in said module.

* * * * *